United States Patent
Burns et al.

(10) Patent No.: US 11,352,301 B2
(45) Date of Patent: Jun. 7, 2022

(54) CONTROLLABLE HIGH FLOW CONCRETE

(71) Applicant: GCP Applied Technologies Inc., Cambridge, MA (US)

(72) Inventors: Elizabeth Burns, Windham, NH (US); Nathan A. Tregger, Northborough, MA (US); Hideo Koyata, Atsugi (JP); Lawrence L. Kuo, Acton, MA (US); Klaus-Alexander Rieder, Beverly, MA (US); Mark F. Roberts, North Andover, MA (US); David Myers, Somerville, MA (US)

( * ) Notice: Subject to any disclaimer, the term of this patent is extended or adjusted under 35 U.S.C. 154(b) by 563 days.

(21) Appl. No.: 16/341,752

(22) PCT Filed: Oct. 11, 2017

(86) PCT No.: PCT/US2017/056122
§ 371 (c)(1),
(2) Date: Apr. 12, 2019

(87) PCT Pub. No.: WO2018/071529
PCT Pub. Date: Apr. 19, 2018

(65) Prior Publication Data
US 2020/0048152 A1    Feb. 13, 2020

Related U.S. Application Data

(60) Provisional application No. 62/408,481, filed on Oct. 14, 2016, provisional application No. 62/525,718, filed on Jun. 27, 2017.

(51) Int. Cl.
| | |
|---|---|
| C04B 40/00 | (2006.01) |
| C04B 14/06 | (2006.01) |
| C04B 16/06 | (2006.01) |
| C04B 24/32 | (2006.01) |
| C04B 24/38 | (2006.01) |
| C04B 28/28 | (2006.01) |
| C04B 103/00 | (2006.01) |
| C04B 111/60 | (2006.01) |

(52) U.S. Cl.
CPC .......... *C04B 40/0039* (2013.01); *C04B 14/06* (2013.01); *C04B 16/065* (2013.01); *C04B 24/32* (2013.01); *C04B 24/383* (2013.01); *C04B 28/28* (2013.01); *C04B 2103/006* (2013.01); *C04B 2111/60* (2013.01); *C04B 2201/10* (2013.01)

(58) Field of Classification Search
CPC ... C04B 14/06; C04B 16/065; C04B 20/0048; C04B 20/0076; C04B 24/32; C04B 24/38; C04B 24/383; C04B 24/2647; C04B 28/02; C04B 28/28; C04B 38/02; C04B 40/0039; C04B 2103/12; C04B 2103/22; C04B 2103/304; C04B 2103/50; C04B 2103/54; C04B 2103/58; C04B 2103/61; C04B 2103/006; C04B 2111/00103; C04B 2111/60; C04B 2201/10
See application file for complete search history.

(56) References Cited

U.S. PATENT DOCUMENTS

| | | | |
|---|---|---|---|
| 5,387,626 | A | 2/1995 | Bohme-Kovac et al. |
| 5,432,215 | A | 7/1995 | Girg et al. |
| 5,976,242 | A | 11/1999 | Blanc et al. |
| 6,258,161 | B1 | 7/2001 | Kerkar et al. |
| 6,800,129 | B2 | 1/2004 | Jardine et al. |
| 7,125,944 | B2 | 10/2006 | Yamashita et al. |
| 7,909,927 | B2 | 3/2011 | Margheritis et al. |
| 8,070,875 | B2 | 12/2011 | Jeknavorian et al. |
| 8,168,701 | B2 | 5/2012 | Koyata et al. |
| 8,377,196 | B2 | 2/2013 | Bury et al. |
| 8,818,561 | B2 | 8/2014 | Koehler et al. |

(Continued)

FOREIGN PATENT DOCUMENTS

| | | |
|---|---|---|
| CN | 102173678 | 11/2012 |
| CN | 103113038 | 5/2013 |

(Continued)

OTHER PUBLICATIONS

Kosmatka et al., "Design and Control of Concrete Mixtures", 16th Ed., selected pages.

(Continued)

*Primary Examiner* — Anthony J Green
(74) *Attorney, Agent, or Firm* — Craig K. Leon

(57) ABSTRACT

The present invention relates to very high workable yet controllable concrete mix design, admixture composition, and process for placing concrete. The mix design relates to particular aggregate/cement ratios and types which are characteristic of ready mix concrete (RMC), which provide high fluidity reminiscent of self-consolidating concrete (SCC), and which provides advantages over both RMC and SCC in terms of ease and speed in placement and finishability at the construction site placement zone, regardless of whether into a horizontal formwork (e.g., for slabs, floors) or into vertical formwork (e.g., for blocks, walls, columns, etc.), without loss of control and without generating high risks of segregation even when small amounts of water are added at the size to facilitate finishing of the concrete surface. An inventive admixture combination which enables this unique design involves two different polycarboxylate comb polymers in combination with two specific viscosity modifying agents, and this combination provides highly workable concrete to be placed in a controlled, efficient manner.

25 Claims, 8 Drawing Sheets

(56) References Cited

U.S. PATENT DOCUMENTS

| | | |
|---|---|---|
| 8,846,784 B2 | 9/2014 | Gaberlein et al. |
| 9,296,939 B2 | 3/2016 | Iverson et al. |
| 9,346,712 B2 | 5/2016 | Baumann et al. |
| 2003/0199616 A1 | 10/2003 | Yamashita et al. |
| 2006/0124034 A1 | 6/2006 | Okazawa et al. |
| 2008/0156225 A1 | 7/2008 | Bury et al. |
| 2015/0175481 A1 | 6/2015 | Pisklak et al. |
| 2016/0009599 A1 | 1/2016 | Tamakawa |

FOREIGN PATENT DOCUMENTS

| | | | |
|---|---|---|---|
| CN | 105293987 | 2/2016 | |
| DE | 3913518 | 4/1989 | |
| EP | 1344754 | 9/2006 | |
| EP | 2966049 | 6/2015 | |
| GB | 1265821 A | 3/1972 | |
| JP | 2014125389 | 7/2014 | |
| WO | 2004087602 | 10/2004 | |
| WO | 2005044752 | 5/2005 | |
| WO | 2007047407 | 4/2007 | |
| WO | 2010047408 | 4/2010 | |
| WO | 2013005609 | 1/2013 | |
| WO | 2015027192 | 2/2016 | |
| WO | WO-2016198608 A1 * | 12/2016 | ......... C04B 16/0633 |

OTHER PUBLICATIONS

Wallevik et al., "Rheology as a tool in concrete science: The use of rheographs and workability boxes", Cement and Concrete Research 41 (2011) 1279-1288, 2011.

Copenheaver, Form PCT/ISA/210, International Search Report for PCT/US2017/056122, dated Dec. 22, 2017, 2 pages.

Copenheaver, Form PCT/ISA/210, Written Opinion of the International Searching Authority for PCT/US2017/056122, dated Dec. 22, 2017, 3 pages.

Lazniewska-Piekarczyk, "The type of air-entraining and viscosity modifying admixtures and porosity and frost durability of high performance self-compacting concrete", Construction and Building Materials, vol. 40, Dec. 23, 2021, pp. 659-671.

* cited by examiner (EXEMPLARY INVENTION)

CONTROLLABLE HIGH FLOW CONCRETE

FIELD OF THE INVENTION

The present invention relates to concrete having high fluidity in terms of high slump and slump flow characteristics, and more particularly to a method and composition wherein a highly fluid concrete composition comprising at least two polycarboxylate comb polymer cement dispersants in combination with particular viscosity modifying agents possesses controllable slump flow properties and advantages when compared to both self-consolidating concrete (SCC) and conventional ready-mix concrete.

BACKGROUND OF THE INVENTION

A concrete mixture typically comprises, a cementitious binder (e.g., ordinary Portland cement often blended with limestone, fly ash, granulated blast furnace slag, and/or other pozzolan), fine aggregate (e.g., natural and/or manufactured sand), coarse aggregate (e.g., gravel, crushed stone), water and, optionally though typically, one or more chemical admixtures for modifying a property of the concrete in its plastic or hardened state. It is common practice to add chemical admixtures for dispersing cement particles, such as plasticizers and superplasticizers, to reduce the amount of mix water required to obtain a desired fluidity of the concrete in its plastic state, and thereby to increase the concrete strength in its hardened state.

When dosage of the "water-reducing" cement dispersant is increased, an increase in the initial consistency (slump) or a corresponding decrease in the yield stress of the plastic concrete is usually obtained. It is also known that, depending upon the type of dispersant or dispersants employed, slump may be retained over time without segregation of the coarse and fine aggregates. However, an increase in the dosage of dispersants (e.g., superplasticizers) to excessive amounts, in the attempt to achieve longer slump life, could cause initial fluidity to increase to the point at which the concrete mix is no longer stable. The loss of stability is manifested in terms of severe segregation of sand and/or stone aggregate constituents from the wet cement paste portion of the concrete. This stability is not guaranteed to be regained once the dispersant wears off. Furthermore, excessive dosages of dispersant can cause undesirable extended setting times.

The fluidity or consistency of concrete is quantitatively described in terms of "slump," which corresponds to the vertical drop of the concrete when demolded from a slump cone, which is a frustum of a cone (see, e.g. ASTM C143/C143M-15a). Very high fluidity is described in terms of "slump flow," which can be measured in terms of the horizontal spread of concrete on a flat surface after the cone is lifted to allow the concrete to demold and to spread on the surface (see, e.g. ASTM C1611/C1611M-14).

The term "ready-mix concrete" (RMC) has typically hitherto been used to refer to concrete mixes having slump values of less than eight inches, as measured by the vertical drop method. When RMC is poured into a placement zone, such as formwork for making floors, the RMC must be consolidated in place, such as by using vibration or screed methods, or embedding aggregate particles beneath the surface, followed by troweling or brushing to achieve a final surface finish. These processes are labor- and time-intensive. These processes can be made more difficult depending upon whether steel reinforcement or complicated formwork is involved.

While water is sometimes added at the construction project site to facilitate the placement and finishing process, the addition of water can weaken the concrete and increase the risk of segregation, whereby aggregate particles will tend to sink and water and cement will float to the surface of the concrete, creating weakness in the resultant structure.

There has been increasing interest in self-consolidating concrete ("SCC"). SCC refers to concrete having such high fluidity or slump flow that it literally flows into place when poured and is self-leveling. SCC usually contains a very high content of particles having a fineness of 150 microns or less and being used in the range of 880 to 950 pounds per cubic yard. See e.g., *Design and Control of Concrete Mixtures*, 15$^{th}$ Ed., Kosmatka, Steven H. and Wilson, Michelle L. (Portland Cement Association, Washington, D.C.). The higher the required flow for the SCC mixture, the higher will be the amount of fine material needed to produce a stable mixture. The amounts of cement and pozzolans, as well as the amounts of viscosity modifying agents (VMAs), must usually be increased to minimize the risk of segregation in SCC mix designs.

Thus, SCC mix designs present a myriad of problems. Due to variation and potential interactions among components of SCC mix designs, it is difficult to obtain consistent fluidity. As mentioned above, the amount of cement in SCC is very high (e.g., even at 700-800 pounds of cement per cubic yard of concrete) such that the ratio of cement/aggregate (for both coarse and fine) also tends to be very high. The high amount of cement leads to problems with excessive heat generation and shrinkage. For example, in SCC, the coarse:fine:cement ratio might be 1:1:0.5; while, for RMC, the ratio could allow for 20 percent more coarse aggregate and 20-40 percent less cement (e.g., 1.2:1:0.4-0.3). Furthermore, SCC tends to require coarse aggregates (e.g. gravel) that have average size that is smaller than half an inch, and thus smaller than typical aggregates used in ready-mix concrete (RMC). Also, SCC tends to flow like water, requiring robust, water-tight formwork; and, because SCC can flow under and over formwork, it will tend to flow out of a placement zone that is not level.

SUMMARY OF THE INVENTION

In surmounting the disadvantages of the prior art, the present invention provides a process, concrete composition, and admixture composition which provides high fluidity characteristics that are reminiscent of self-consolidating concrete (SCC) mix designs, but provides the ability to decrease segregation risk by employing a mix design that is more reminiscent of ready-mix concrete (RMC).

In particular, mix designs of the present invention will resemble RMC by having a high stone content, the amount of coarse aggregate (e.g., crushed gravel, stone) being present in an amount greater than 1550 (and more preferably greater than 1600) pounds per cubic yard of concrete, and by having a low cement content, the amount of cement being less than 658 pounds per cubic yard of concrete, while also employing a low fine aggregate (e.g., sand) content.

Exemplary concrete mix designs of the invention will also have a fluidity in the range of 13 to 30 inch slump flow, and more preferably 15 to 25 inch slump flow, and would require minimal consolidating work at the placement site. Further, the invention provides for fluidity to last at least one hour, so that lengthy distances from the plant to job site are less problematic for delivery operations.

The fluidity of these exemplary concretes can be characterized using rheological techniques. A variety of commercial concrete rheometers are available including ICAR™ from German Instruments and Pheso™ Rheometer from Calmetrix, Inc. Concrete is described as a yield-stress material; it will not flow until sufficient force is applied. Yield stress materials are typically described by the Bingham model, or elaborations on the basic model. Concrete can be characterized by a static yield-stress describing the force needed to initiate flow; by a plastic viscosity during flow, and by the Bingham yield stress, which determines when the concrete comes to rest. Exemplary concretes have static yield stress values close to that of SCC, lower plastic viscosities compared to SCC once flowing, and a small but measurable Bingham yield stress, which means the concrete is not self-leveling. This is useful in four ways: less energy is needed to begin flow (low static yield stress), less energy needed to pump the concrete (lower plastic viscosity), nearly Newtonian behavior (no shear thickening, so it will flow even when pumped at high flow rates) and the ability to maintain a sufficient grade while requiring minimal consolidation.

Another advantage of the mix designs of the invention is that consistency of the concrete can be increased in a predictable fashion with non-excessive amounts of water and/or chemical admixture at the site without substantially increasing risk of segregation or the diminishment of concrete compressive strength.

Exemplary concrete mix designs, additive compositions, and methods of the invention involve the use of two cement dispersant polymers and two particular viscosity modifying agents in combination. While use of multiple dispersants or viscosity modifying agents have been previously taught in the concrete industry, the present invention enables a novel concrete mix design that resembles conventional aggregate types and amounts (reminiscent of RMC) but also provides for very high fluidity (reminiscent of SCC) and also excellent retention of fluidity over time and resistance to segregation even when water and/or admixture is added at the delivery construction site to facilitate placement and finishing of the concrete.

It is an object of the present invention to provide such a concrete mixture and an enabling admixture combination, resulting in a concrete having enhanced consistency and flow, but without increasing the content of aggregate particles finer than 150 microns as compared to conventional RMC.

It is a further object of the present invention to combine the useful properties of RMC and SCC, whereby the concrete flows quickly and provides fluidity, but is controllable and does not require high amounts of cement or high amounts of fine aggregate compared to SCC.

By reducing the cement requirement and allowing for flexibility in aggregate use as compared to SCC, the invention reduces costs and complexity for concrete producers, decreases shrinkage and heat generation within the concrete, and reduces the carbon footprint as compared to conventional SCC.

An exemplary process of the present invention for placing a highly flowable concrete with enhanced placement control comprises: (A) providing, at a delivery site, at least one concrete delivery mixer-truck load of concrete having a total pour volume of 1 to 16 cubic yards into a placement zone, the concrete load mixture comprising (i) coarse aggregate in the amount of at least 1550 pounds per cubic yard based on total volume of the concrete load mixture, wherein at least thirty percent of the coarse aggregate is retained on a sieve with a 0.5 inch opening as determined by standard sieve testing under ASTM C33/C33M-16; (ii) cementitious binder in the amount of 376 to 752 pounds (and, more preferably, 376-708 pounds) per cubic yard of the concrete load mixture; (iii) a polysaccharide biopolymer selected from the group consisting of welan, diutan, xanthan, guar gum, or mixture thereof, the biopolymer being present in the amount of 0.0003 to 0.003 pounds per hundred pounds of cementitious binder within the concrete load mixture; (iv) a modified cellulose present in the amount of 0.0005 to 0.005 per hundred pounds of cementitious binder within the concrete load mixture; and (v) at least two cement dispersant polycarboxylate comb polymers having pendant (poly)alkylene oxide groups selected from ethylene oxide, propylene oxide, or mixture thereof, said at least two comb polymers each being present in the amount of 0.02 to 0.12 pounds per 100 pounds of cementitious binder in the concrete load mixture, a first of said at least two comb polymers having zero to less than six percent mole fraction hydrolysable groups selected from esters, amides, or mixture thereof, a second of said at least two comb polymers having six percent or higher mole fraction of hydrolysable groups selected from esters, amides, or mixture thereof, and said second comb polymer having at least two percent more hydrolysable groups than said first comb polymer; and (B) pouring, into a placement zone to form a pavement, slab, floor, elevated deck, foundation, bridge deck, wall, column, dam, or portion thereof, the concrete load mixture having a slump flow within the range of 13-30 inches.

An exemplary additive composition of the present invention thus comprises; (A) a polysaccharide biopolymer selected from the group consisting of welan, diutan, xanthan, guar gum, or mixture thereof, the biopolymer being present in the amount of 0.02 to 0.2 wt % based on total weight of the additive composition; (B) a modified cellulose present in the amount of 0.04 to 0.4 wt % based on total weight of the additive composition; and (C) at least two cement dispersant polycarboxylate comb polymers having pendant (poly)alkylene oxide groups selected from ethylene oxide, propylene oxide, or mixture thereof, said at least two comb polymers each being present in the amount of 2 to 20 based on total weight of the additive composition, a first of said at least two comb polymers having zero to less than six percent mole fraction hydrolysable groups selected from esters, amides, or mixture thereof, a second of said at least two comb polymers having six percent or higher mole fraction of hydrolysable groups selected from esters, amides, or mixture thereof, and said second comb polymer having at least two percent more hydrolysable groups than said first comb polymer.

The present invention also provides a concrete composition and structure made from the above-described process and additive composition.

Further advantages and benefits of the present invention are described in other detail hereinafter.

BRIEF DESCRIPTION OF THE DRAWINGS

An appreciation of the benefits and features of the invention may be more readily comprehended when the following written description of preferred embodiments is considered in conjunction with the drawings, wherein.

DETAILED DESCRIPTION OF EXEMPLARY EMBODIMENTS

Figure 1:
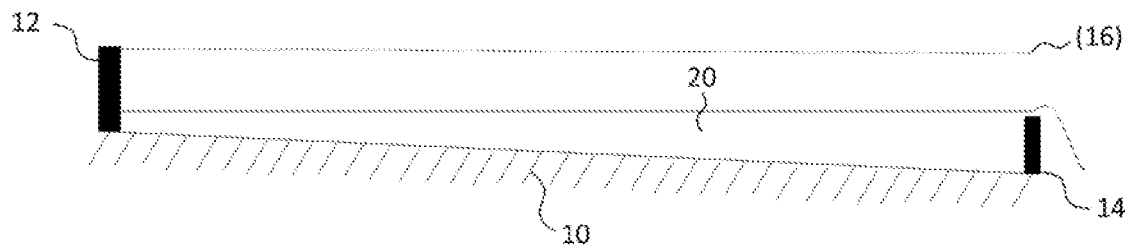
FIG. 1 is a diagram of PRIOR ART self-consolidating concrete (SCC) which can flow out of control if poured into a formwork which is not on level ground or level surface or over a form wall which is lower than other form walls which define the placement zone.

The term "cement" as used herein includes hydratable cement such as Portland cement which is produced by pulverizing clinker consisting of hydraulic calcium silicates, aluminates and aluminoferrites, and one or more forms of calcium sulfate (e.g., gypsum) as an interground additive. Typically, Portland cement is combined with one or more supplemental cementitious materials, such as fly ash, granulated blast furnace slag, limestone, natural pozzolans, or mixtures thereof, and provided as a blend. Thus, "cement" and "cement binder" may also include supplemental cementitious materials, which have been inter-ground with Portland cement during manufacture. The term "cementitious" may be used herein to refer to materials that comprise Portland cement or which otherwise function as a binder to hold together fine aggregates (e.g., sand) and coarse aggregates (e.g., crushed gravel, stone) which are used for constituting concrete.

The term "hydratable" as used herein is intended to refer to cement or cementitious materials that are hardened by chemical interaction with water. Portland cement clinker is a partially fused mass primarily composed of hydratable calcium silicates. The calcium silicates are essentially a mixture of tricalcium silicate ($3CaO.SiO_2$ or "$C_3S$" in cement chemists' notation) and dicalcium silicate ($2CaO.SiO_2$, "$C_2S$") in which the former is the dominant form, with lesser amounts of tricalcium aluminate ($3CaO.Al_2O_3$, "$C_3A$") and tetracalcium aluminoferrite ($4CaO.Al_2O_3.Fe_2O_3$, "$C_4AF$"). See e.g., Dodson, Vance H., Concrete Admixtures (Van Nostrand Reinhold, New York, N.Y. 1990), page 1.

The term "concrete" thus typically refers to hydratable cementitious mixtures comprising cement, sand as fine aggregate, and usually coarse aggregate such as crushed gravel or stones, and optionally one or more chemical admixtures. Chemical admixtures are added to concrete for purposes of modifying any number of properties, including, by way of example, reducing the need for water (e.g., plasticizing, increasing fluidity), controlling the setting of concrete (e.g., set accelerating, set retarding), managing air content and quality (e.g., air entraining agents, air detraining agents), shrinkage reduction, corrosion inhibition, and other properties.

The term "aggregate" as used herein shall mean and refer to sand or stone particles used for construction materials such as concrete, mortar, and asphalt, and this typically involves granular particles of average size between 0 and 50 mm. Aggregates may comprise calciferous, siliceous or siliceous limestone minerals. Such aggregates may be natural sand (e.g., derived from glacial, alluvial, or marine deposits which are typically weathered such that the particles have smooth surfaces) or may be of the "manufactured" type, which are made using mechanical crushers or grinding devices.

More specifically, the term "fine aggregate" or "sand" shall refer to aggregates for use in construction materials that meet requirements of ASTM C33/C33M-16 or AASHTO M6-13/M43-05. These requirements include, for example, grading limits that require 100% of the fine aggregate to pass through a ⅜ inch sieve.

Furthermore, the term, "coarse aggregate" or "stone" shall refer to aggregates for use in construction materials that meet requirements of ASTM C33/C33M-16 or AASHTO M80-13. These requirements also include specific grading limits.

The term "flatwork concrete" or "horizontal formwork" shall mean and refer to a general term applicable to concrete floors and slabs that require finishing operations, as defined by ACI CT-16. This can include slab-on-grade, pavements, floors, foundations, elevated decks, bridge decks, floor decks, sidewalks.

The term "edge stability" shall be a description of the leading edge of a concrete mass after or upon being poured into an area prepared for flatwork concrete. A higher stability can support a taller leading vertical edge of compared to the maximum height of the concrete mass that was poured. When conducting a test such as the slump flow test in accordance to ASTM C1611/C1611M-14 (or an "L-box test", see e.g. "Specification and Guidelines for Self-Compacting Concrete," EFNARC (European Federation of National Trade Associations), Surrey, UK, February 2002), the edge stability can be quantified through various means to investigate the shape of the leading edge.

Preferably, the processes and concrete mixes of the invention are batched, delivered, monitored, and poured from a concrete mixer truck having a rotatable mixer drum that is continuously monitored using concrete slump management (monitoring) systems for managing slump or other rheological properties. Such slump monitoring systems are commercially available from Verifi LLC, 62 Whittemore Avenue, Cambridge, Mass., USA, which has disclosed various automated concrete monitoring methods and systems in the patent literature, such as U.S. Pat. Nos. 8,020,431; 8,118,473; 8,311,678; 8,491,717; 8,727,604; 8,764,273; 8,989,905; 9,466,203; 9,550,312; as well as U.S. Ser. No. 11/834, 002 (Publ. No. US 2009/0037026 A1); US Ser. No. 258,103 (Publ. No. 2012/0016523 A1); PCT/US2015/025054 (Publ. No. WO 2015/160610 A1); and PCT/US2014/065709 (Publ. No. WO2015073825 A1).

Alternatively, the slump monitoring system may be based use of a force sensor (or strain gauge) which is mounted within the drum. An example is disclosed in U.S. Pat. No. 8,848,061 and US Publication No. 2015/0051737 A1 of Berman (Sensocrete Inc., an affiliate of GCP Applied Technologies Inc., Cambridge Mass. USA), U.S. Pat. No. 9,199,391 of Denis Beaupre et al. (I.B.B. Rheologie Inc.), or US Publication No. 2009/0171595 and WO 2007/060272 of Benegas.

The term "placement zone" is any area, receptacle, excavation, formwork (e.g., cavity or receptacle defined by boards), or mold into which concrete is poured into place at a construction site, and this can include horizontal formwork (or "flatwork" for slabs, floors, decks, etc., as described above) or vertical formwork (having sides which are suitably tall enough to cast blocks, walls, panels, columns, or taller structures).

Figure 2:
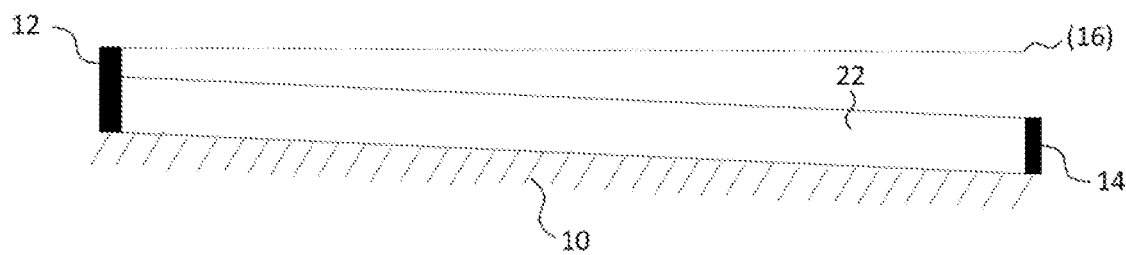
FIG. 2 is a diagram of PRIOR ART ready-mix concrete (RMC) which must be vibrated into place and finished such as by screeding to maintain a desired grade.
Figure 3:
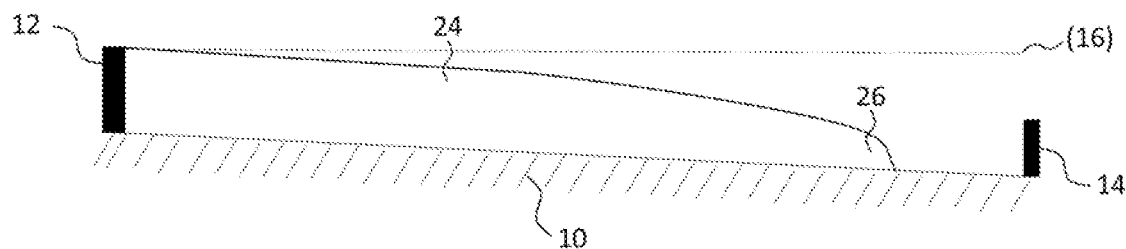
FIG. 3 is a diagram of an exemplary concrete composition of the present invention used in a horizontal slab application, the concrete having high flow properties similar to SCC but providing controllable fluidity while requiring little vibration as usually required for RMC.

FIGS. 1-3 demonstrate how different concretes perform when placed in an area prepared for flatwork, such as where the prepared subgrade has an inclined surface, and the desired slab (or floor or deck) surface should be made parallel to the inclined subgrade. Surfaces with a slight incline are particularly common in road pavements, where a grade is required to allow proper drainage during rain or snow events. In particular, FIG. 1 shows the disadvantage of using a self-consolidating concrete (SCC) or other self-leveling concrete (designated at 20). As shown in FIG. 1, the self-leveling nature of the concrete 20 defeats the desire to maintain parallelism with non-level ground (designated at 10) or horizontal surface of the placement zone (defined by ground 10 and formwork boards 12 and 14) which is not level (as suggested by dotted level line in FIGS. 1-3 at 16). The SCC (designated at 20) tends to flow over or under formwork 12/14 such as the fixed board shown at 14. Typically, ready-mix concrete (RMC) would be used in non-level grade situations, wherein slump would be a more controllable 5 to 8 inches.

As shown in FIG. 2, a top surface of a prior art RMC (designated at 22) can be made parallel to non-level ground (10) or to bottom formwork, if used, within the placement zone defined within formwork (designated at 12 and 14). However, this requires careful use of vibration. If prior art methods are used to increase fluidity (including adding water or superplasticizers), the amount or extent of vibration can be reduced, but the aggregates within the concrete 22 will tend to segregate within the volume of the concrete 22.

FIG. 3 illustrates an exemplary high flow concrete 24 of the present invention wherein an upper surface of the concrete structure can be made parallel with non-level ground or grade (10) with little vibration or finishing efforts. In preferred methods and compositions of the present invention, moreover, the high flow nature concrete 24 of the present invention, particularly when used in horizontal slab-on-grade or flooring (or elevated deck) applications, demonstrates an edge stability that prevents the concrete from flowing over and under formwork 12/14 while also allowing the concrete mass to easily move within the placement zone.

An exemplary process of the present invention for placing a high flow concrete into a placement zone, comprises: (A) providing, at a delivery site, at least one concrete delivery mixer-truck load of concrete having a total pour volume of 1 to 16 cubic yards into a placement zone, the concrete load mixture comprising (i) coarse aggregate (which is a term of art described for example in ASTM C33/C33M-16 or AASHTO M80-13) in the amount of at least 1550 pounds per cubic yard, more preferably at least 1600, 1700, and most preferably at least 1800 pounds per cubic yard) based on total volume of the concrete load mixture, wherein at least forty percent of the coarse aggregate is retained on a sieve with a 0.5 inch opening as determined by standard sieve testing under ASTM C33/C33M-16 (Table 3); (ii) cementitious binder (which includes Portland cement with or without limestone, fly ash, granulated blast furnace slag, or other pozzolan material) in the amount of 376-752 pounds per cubic yard (and, more preferably, 423-658, and, most preferably, 423-564 pounds per cubic yard) of the concrete load mixture; (iii) a polysaccharide biopolymer selected from the group consisting of welan, diutan, xanthan, guar gum, or mixture thereof, the biopolymer being present in the amount of 0.0003 to 0.003 per hundred pounds of cementitious binder within the concrete load mixture; (iv) a modified cellulose present in the amount of 0.0005 to 0.005 per hundred pounds of cementitious binder within the concrete load mixture; and (v) at least two cement dispersant polycarboxylate comb polymers having pendant (poly)alkylene oxide groups selected from ethylene oxide, propylene oxide, or mixture thereof, said at least two comb polymers each being present in the amount of 0.02 to 0.12 (more preferably 0.03 to 0.10, and most preferably 0.04 to 0.08) pounds per 100 pounds of cementitious binder in the concrete load mixture, a first of said at least two comb polymers having zero to less than six percent mole fraction hydrolysable groups selected from esters, amides, or mixture thereof, a second of said at least two comb polymers having six percent or higher mole fraction of hydrolysable groups selected from esters, amides, or mixture thereof, and said second comb polymer having at least two percent more hydrolysable groups than said first comb polymer; and (B) pouring, into a placement zone to form a pavement, slab, floor, foundation, bridge deck, wall, column, dam, or portion thereof, the concrete load mixture having a slump flow within the range of 13 to 30 inches (as may be confirmed using slump flow cone test in accordance with ASTM C1611/C1611M-14 or with automated concrete monitoring system calibrated to ASTM C1611/C1611M-14).

The present invention thus also provides a concrete composition or structure made from the foregoing process, as well as an admixture composition comprising the above-mentioned polymers and viscosity modifying agents.

Figure 4A:
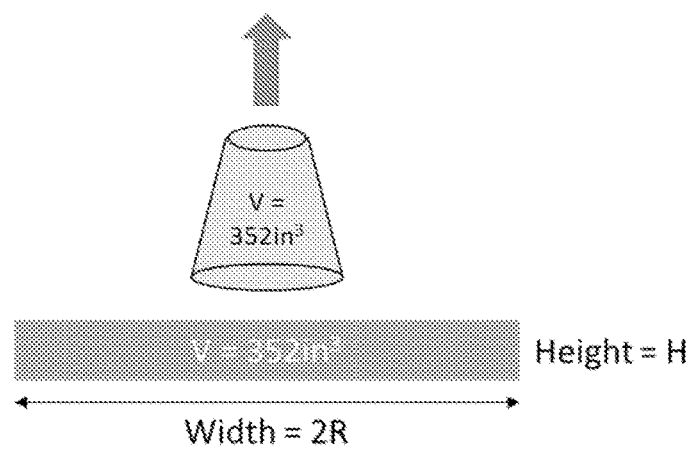
FIG. 4a is an illustration of a slump flow test wherein a theoretically perfectly horizontal surface is achieved with theoretically perfect vertical edges (suggesting what perfect edge stability would look like)
Figure 4B:
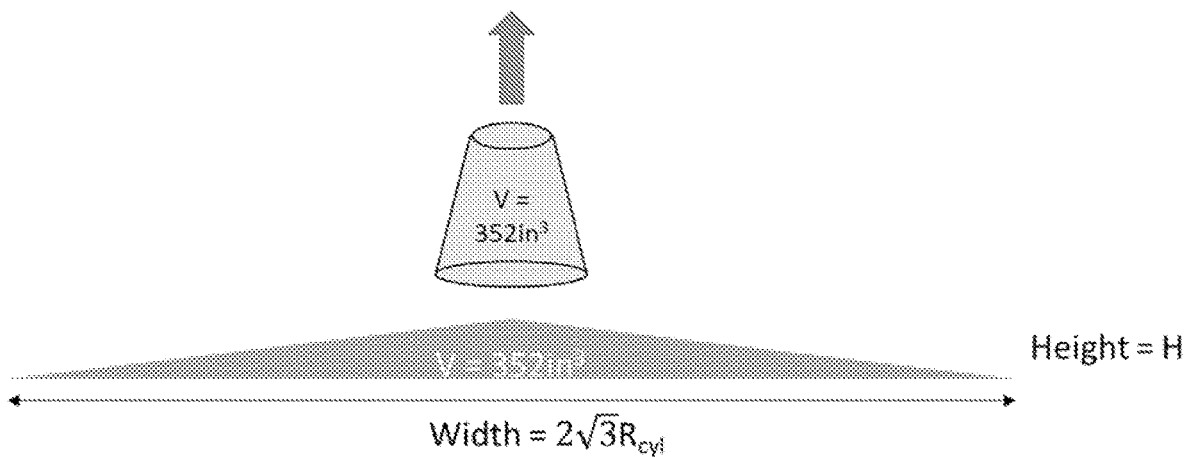
FIG. 4b is an illustration of a theoretical example of a slump flow test wherein an isosceles triangle is formed (suggesting what total lack of edge stability would look like)
Figure 4C:
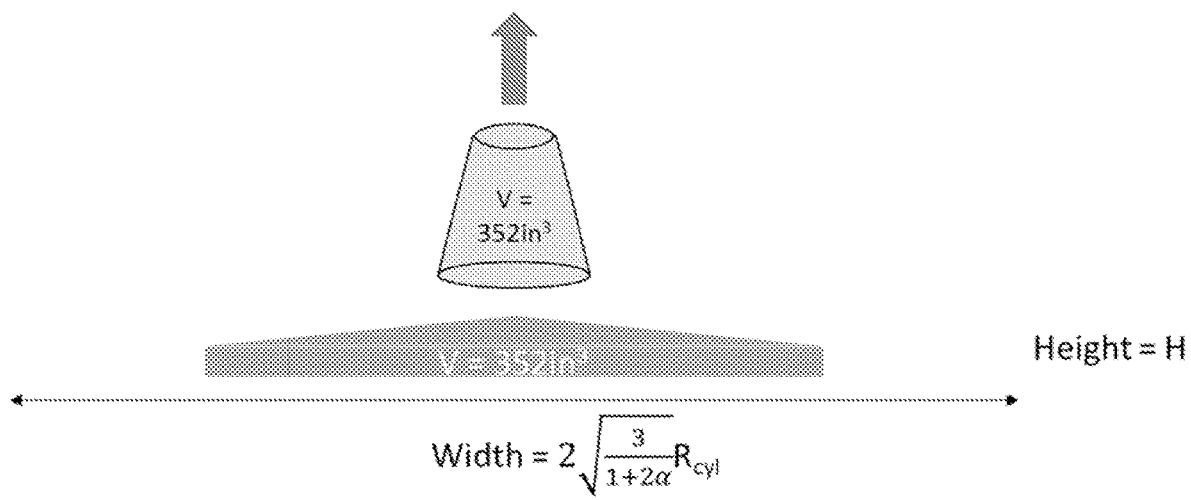

The present inventors have discovered that surprisingly, different leading edge shapes (or edge stability) can be achieved for the same slump flow parameters including slump flow diameters and $T_{20}$, where 20 refers to 20 inches (or $T_{50}$, where 50 refers to 50 cm). To appreciate more readily the benefits of the present invention, especially in terms of concrete pour edge stability, two theoretically cases can be considered. In the first theoretical case, a slump flow test (e.g. ASTM C1611/C1611M-14) results in a perfectly horizontal concrete surface and perfectly vertical side edges. In other words, the resulting shape is a cylinder, with height, H and radius, $R_{cyl}$. A two-dimensional projection is shown in the theoretical diagram of FIG. 4a. The volume of the cylinder is given by $V=\pi R_{cyl}^2 H$, wherein V is the cylinder volume calculated based on the ratio between a circle's circumference to its diameter, $\pi$, the square of the radius $R_{cyl}$ and height H of the cylinder. This represents the limit case for a flowable concrete with perfect edge stability. In the second case, the slump cone test is performed, and the resulting shape is a cone, with height H, equal to the first scenario, and radius, $R_{cone}$. When this is considered in two dimensions, an isosceles triangle would be seen as shown in the theoretical diagram of FIG. 4b. The volume is given by the following relationship, $V=\pi R_{cone}^2 H/3$. In both theoretical cases, equal volumes of concrete are used, which means that $R_{cone}=\sqrt{3}R_{cyl}$ (setting the volumes and heights in each scenario equal, and solving for the radius of the cone, $R_{cone}$, in the second scenario). Thus, the edge stability is sacrificed for increased radial flow. A third scenario can be envisioned, which is an intermediate between the two limit cases discussed above. In this scenario, the resulting shape does not have a horizontal surface, but does retain vertical edges. This can be described as a cylinder with a cone on top, both with radius, $R_{int}$, as shown in FIG. 4c. Denoting the total height to be H, equal to the first scenario, the height of the vertical edge can be described as a fraction $\alpha$ of H. In this manner, after adding the volumes of the cone and cylinder, both with radius $R_{int}$ and a total height of H, the volume is given by the relationship: $V=\pi R_{int}^2 H(1+2\alpha)/3$. For an $\alpha=1$, the edge height becomes H, representing the first scenario, while for an $\alpha=0$, the edge height becomes 0, representing the second scenario. In terms of the radius of the cylinder in first scenario, $$R_{int} = \sqrt{\frac{3}{1+2\alpha}} R_{cyl}.$$

Figure 5:
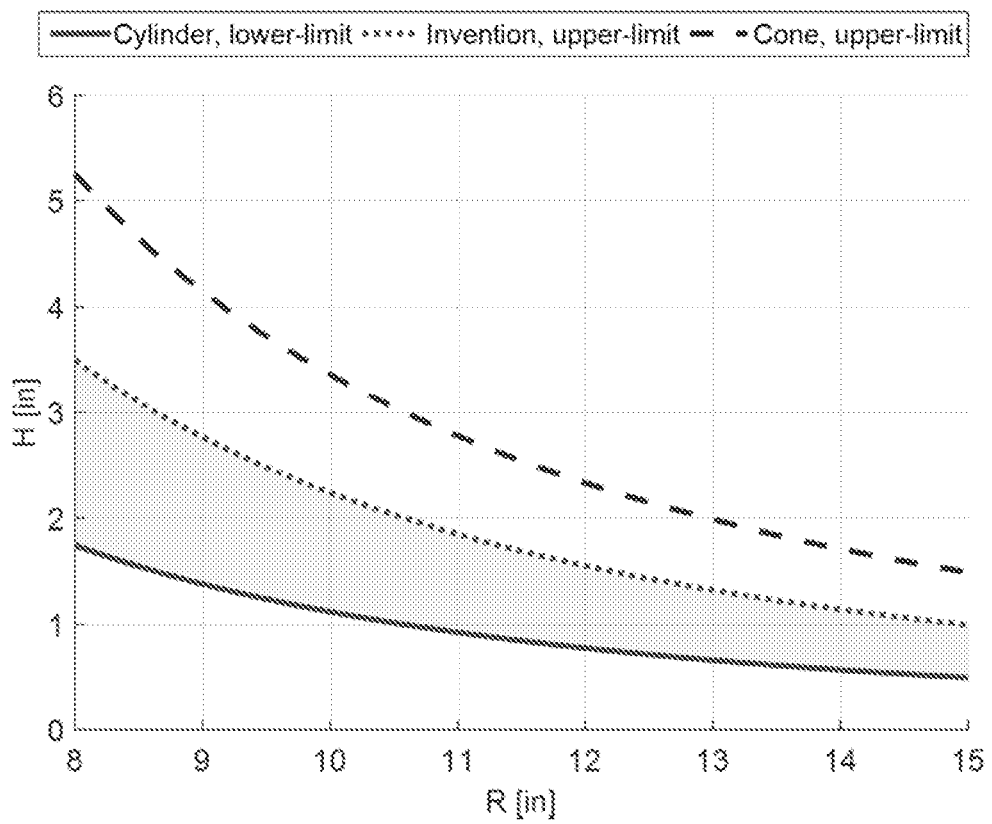
FIG. 5 is a graph of the relationship between the maximum height and maximum radial spread when a standard cone test for slump flow is applied to various concrete mixes.

The present inventors have discovered that the present invention enables a superior edge and can be quantified, for example, from the results of a slump flow test (such as in accordance with ASTM C1611/C1611M-14). Based on the results, the maximum radial spread, R, and the total height, H, can be measured readily. In considering the three scenarios previously described, as well as the fact that for each slump flow test, the same volume of concrete is produced, the height, H, of the concrete mass resulting from the slump flow test (ASTM C1611/C1611M-14) can be plotted as a function of the maximum radial spread, R, as graphically illustrated in FIG. 5. For the present inventions, surprising control in terms of superior edge stability (which is best appreciated when the concrete is poured into horizontal pour zones such as slab, flooring, or deck formwork or volumes) is illustrated in the shaded region shown of FIG. 5. This region can be defined as the region between two lines: a lower limit, coinciding with a volume of concrete with completely vertical edges described by the relationship: $H(R)=V/(\pi R^2)$, and an upper limit, which is described by the relationship: $H(R)=\lambda V/(\pi R^2)$, where $\lambda$ is a constant. This can be stated in an alternative way, wherein R and H satisfy the following relationship:

$$1 \le \frac{\pi R^2 H}{V} \le \lambda.$$

The present inventors have found $\lambda$ to be 2.5, and, more preferably, 2. The absolute upper limit, coinciding with a volume of concrete with no vertical edges is described by $H(R)=3V/(\pi R^2)$. In these equations, the volume of the slump cone is approximately 352 cubic inches. The constant $\lambda$ can be related back to $$\alpha \text{ via} = \frac{3}{2\lambda} - \frac{1}{2}.$$

As such, $\alpha=0.1$ for a $\lambda$ of 2.5, and $\alpha=0.25$ for a $\lambda$ of 2.0. From a theoretical standpoint, $\alpha$ is physically meaningful, as $\alpha=0$ corresponds to zero edge, while $\alpha=1$ corresponds to a fully vertical edge. However, the vertical edge can be a challenge to measure in the field, whereas a $\lambda$, calculated from only the final maximum radial spread, R and the maximum height, H, provides a quick way to determine the edge stability of a given concrete mix.

The present inventors believe that $\alpha$ and $\lambda$ suggest the thixotropic nature of the concrete mix. Concrete mixes with higher thixotropy are able to rebuild their microstructure much more quickly after disturbance. As concrete mixes of the present invention approach its maximum radial spread (such as during slump flow testing), their microstructures rebuild quickly to sustain a superior outward edge. Therefore, concretes exhibiting $\alpha$ or $\lambda$ approaching 1 with a minimum specified slump flow (or slump) can be particularly suited for applications relying on high thixotropy. Examples include high flowable concretes for: columns or walls requiring high thixotropy to minimize formwork pressure (see e.g., "Evaluation of SCC Formwork Pressure" in *Concrete International*, June 2010); slip-form paving (see e.g., "Self-Consolidating Concrete—Applications for Slip-Form Paving: Phase II", Report No. DTFH61-06-H-00011 (Work Plan 6)); and segregation resistance (see e.g., U.S. Pat. No. 8,764,272). The novel combination of specific VMAs is believed by the present inventors to enable an optimum edge quality for a given maximum radial spread.

The present inventors believe that the present invention can also be described in terms of the shape of the leading edge of the concrete spread. For example, in considering a slump flow test (ASTM C1611/C1611M-14), a two-dimensional profile can be captured with, for example, a digital camera. The resulting image can be analyzed to determine the edge of the concrete flow, as set forth in FIG. 6a and FIG. 6b. A number of mathematical functions could perhaps be used to define the edge of the concrete, and as an example a function of the form $h(r)=[\alpha(R-r)]^b$ can be used, which relates the height, h, of the concrete a function of r, the radial spread through the functional form with form-fitting constants a and b. R, as previously mentioned, refers to the maximum radial spread. Various characteristics can be calculated for a given leading edge. For example, the derivative can be calculated readily from the function, or numerically if no function is given.

Figure 7:
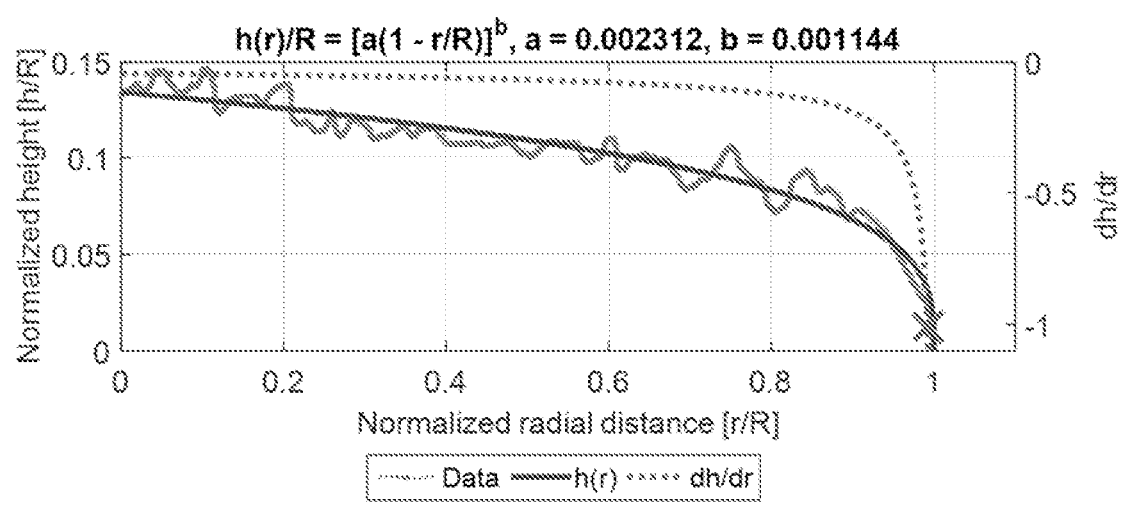
FIG. 7 is a graphic illustration of an edge of poured concrete made in accordance with the present invention.

In FIG. 7, the edge of the concrete flow is illustrated using a plot of the function h(r), with respect to normalized height and radial distance at outermost radius of the concrete pour (when viewed within a horizontal formwork application, for example), and the first derivative of h(r), dh/dr. Note that the radial distance and height have been normalized by the maximum radial spread, R. The present inventors believe that one method to describe the curvature of the leading edge is to consider when the first derivative (or slope) falls below a certain threshold. For example, the point at which the slope falls below −1 (corresponding to an angle of 45°) can be found along with the corresponding radial spread and height. Typically, it has been found that after a slope of −1 has been achieved, the slope quickly diverges to negative infinity (indicating a vertical edge). For concretes with superior edge stability, the height at which this slope is achieved will be significant compared to those concretes with poor edge stability. Mathematically, this is given as:

$$h\left(\frac{dh}{dr} = S_{crit}\right) \bigg/ H \ge h_{crit}$$

wherein $$h\left(\frac{dh}{dr} = S_{crit}\right)$$

represents the height at which the slope of the H(r) relationship, dh/dr, equals a critical slope, $S_{crit}$; and further wherein H is the maximum height, and $h_{crit}$ is a critical height value ranging from 0 to 1. In the case described above, $S_{crit}$ is −1, and $h_{crit}$ is 0.05, more preferably 0.1 and most preferably 0.2.

The foregoing discussion of the unique characteristics of the leading edge of the poured concrete are best appreciated or comprehended when the concrete load mix is poured from a concrete mixer delivery truck into a horizontal application, such as slab-on-grade, flooring, or other formwork application, wherein the resultant concrete structure has a high aspect ratio in terms of thickness (or depth) versus width or upward surface area. For example, where the pour zone has a much larger volume than the load volume of the mixer drum of the delivery truck, the concrete mix designs of the present invention will have a pour shape that facilitates subsequent load pours into the same pour zone, in that the majority of the upward surface of the concrete will require little or no compaction (or troweling), and will have a leading pour edge that has a curvature compared to the majority of the upward surface.

Hence, in further exemplary processes of the invention, the placement zone has a volume that exceeds the delivery truck-load pour volume. The concrete load will flow freely into the volume of the placement zone, and, with a curvature of the leading edge, illustrated generally by FIGS. 3, 6a, and 6b for example, will facilitate pouring of a subsequent concrete load mix which, in turn, requires little compaction or vibration to render a contiguous segment due to its high slump flow property.

The manageable high flow property of concrete mix designs of the present invention can be achieved even if a high proportion of manufactured (crushed) aggregate is used. Exemplary concrete mix designs thus comprise a fine aggregate selected from natural sand, manufactured (crushed) sand, or mixture thereof. In exemplary processes and mix compositions of the present invention, the present inventors believe that the fine aggregate can comprise at least 50% manufactured (crushed) sand, based on weight of total fine aggregates in the concrete load mixture.

The following ranges are given, measured by a vane rheometer, the ICAR™ Plus, sold by Germann Instruments. Exemplary concrete and self-consolidating concrete have static yield stress (associated with the initiation of flow) of 250 to 1500 Pascals (Pa), while conventional concrete has a static yield stress of greater than 1500 Pa. The self-consolidating concrete has a Bingham yield stress of less than 30, indicating it continues to flow, often until it reaches an obstacle. The exemplary concrete has a Bingham yield stress (associated with the cessation of flow) of about 100 Pa, higher than SCC, but much less than conventional concrete, which has a Bingham yield stress of greater than 500 Pa. This means the exemplary concrete will flow easily, but will cease flowing more readily than SCC. Thus, the advantage of the exemplary admixture is manifested when the resultant concrete mix flows easily, but not too easily.

The present inventors, in describing at least two cement dispersant polycarboxylate comb polymers, contemplate that one of the at least two comb polymers will be chosen for initial slump enhancement, while a second of the at least two comb polymers will be chosen for enhancement of slump retention. In preferred embodiments, the at least two cement dispersant comb polymers are both obtained from three monomer Components A, B, and C, wherein Component A is an unsaturated carboxylic acid monomer represented by structural formula 1,

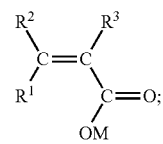
[formula 1]

Component B is a polyoxyalkylene monomer represented by structural formula 2:

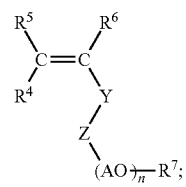
[formula 2]

and
Component C is an unsaturated carboxylate ester or amide monomer represented by structural formula 3:

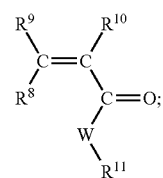
[formula 3]

wherein $R^1$, $R^2$, $R^3$, $R^4$, $R^5$, $R^6$, $R^7$, $R^8$, $R^9$, and $R^{10}$ each individually represent a hydrogen atom, a C1 to C4 alkyl group, or —COOM group wherein M represents a hydrogen atom or an alkali metal; Y represents —(CH$_2$)$_p$— wherein "p" represents an integer of 0 to 6; Z represents —O—, —COO—, —OCO—, —COHN—, or —NHCO— group; -(AO)n represents repeating ethylene oxide groups, propylene oxide groups, butylene oxide groups, or a mixture thereof; "n" represents the average number of repeating -(AO)— groups and is an integer of from 10 to 250; W represents an oxygen atom or an —NH— group, and $R_{11}$ represents a $C_1$-$C_{10}$ alkyl group or a $C_2$-$C_{10}$ hydroxyalkyl group.

In still further embodiments, the first of said at least two comb polymers provides (initial) slump enhancement in the concrete load mixture and has components A and B in a molar ratio (A:B+C) in the range of 2:1 to 5:1, and comprises component C in an amount of 0 to less than 0.2 [mole fraction of repeat units]; and the second of said at least two comb polymer enhances slump retention in the concrete load mixture and has components A, B, and C in the molar ratio range (A:B+C) of 0.3:1 to 3:1, wherein component C is present in an amount of at least 0.2 [mole fraction of repeat units]. Preferably, the first polymer and second polymer are present in the ratio of 9:1 to 1:9 (more preferably between 5/1 and 1/5, and most preferably between 2/1 and 1/1).

The composition of polycarboxylates may be determined by integration of $^1$HNMR, as is well known in the art. For example Plank, Johann; Li, Huiqun; Ilg, Manuel; Pickelmann, Julia; Eisenreich, Wolfgang; Yao, Yan; Wang, Ziming; *Cement and Concrete Research* (2016)84, 20-29 describes one common procedure.

In other exemplary compositions and processes of the present invention, the concrete mix load comprises at least three different cement dispersant polycarboxylate comb polymers.

In preferred compositions and processes of the present invention, the polysaccharide polymer is diutan and the modified cellulose is hydroxyethylmethylcellulose, hydroxypropylmethylcellulose, or mixture thereof. The combination of diutan and hydroxypropylmethylcellulose are most preferred.

In preferred processes for placing concrete, the concrete load mixture is poured having a slump flow within 16 to 24 inches. In other exemplary processes, the placement zone is defined by using concrete flatwork as defined by ACI CT-16, whereby the pouring provides a concrete pavement, slab-on-grade, mat foundation, floor, bridge deck, or portion thereof. In preferred processes of the present invention, the concrete load mix being poured into an area prepared for concrete flatwork, as defined by ACI CT-16, has a slump flow radius, R, in accordance with the slump flow test of ASTM C1611/C1611M-14, and a maximum height, H, of the concrete mass as a result of performing a slump flow test in accordance to ASTM C1611/C1611M-14, such that the H value satisfies the relationship $$1 \le \frac{\pi R^2 H}{V} \le 2.5,$$

where V is the volume of the slump cone (and more preferably between 1 and 2).

In another exemplary process, the concrete is poured into an area having concrete flatwork as defined by ACI CT-16, the concrete having a leading edge which has a curvature compared to an uppermost area of the concrete poured, when subjected to slump flow test in accordance to ASTM C1611/C1611M-14, being characterized, wherein the height as a function of the radial spread, h(r), evaluated where the first derivative of h(r) with respect to r is equal to −1 and normalized by the maximum height of the concrete mass resulting from performing a slump flow test in accordance to ASTM C1611/C1611M-14, H, is greater than or equal to a critical height, $h_{crit}$, of 0.05 (and more preferably, 0.10 and most preferably, 0.20).

In still further exemplary processes of the present invention, the at least two cement dispersant polycarboxylate polymers, the polysaccharide biopolymer, and modified cellulose are introduced into the concrete load mixture during batching of the concrete load mixture at a batch plant.

In other exemplary processes, one or both cement dispersant polycarboxylate comb polymers (separately from the viscosity modifying agents) can be introduced into the load mixture during transit of the concrete from the batch plant to the delivery site, at the delivery site, or both during batching and transit. In most preferred processes of the invention, the concrete mix load is poured from concrete delivery mixer trucks having onboard slump monitoring systems, slump flow monitoring systems, or combinations thereof. Such automated concrete monitoring systems will enable the concrete mix load, for example, to be transported at a slump below 9 inches during transit, and, upon arrival at the construction delivery site, the fluidity of the concrete load can be increased to a slump above 9 inches after the delivery site has been reached. Most preferably, the concrete monitoring systems are onboard slump monitoring systems which involve the use of hydraulic pressure sensors for monitoring both charge and discharge pressure of a hydraulic drive connected to a rotatable concrete mixer drum used for monitoring the concrete mix load on the delivery truck.

In still further exemplary processes of the present invention, the concrete load mixture is prepared by introducing a first admixture component, which comprises a high range water reducing admixture in an amount effective for achieving a slump of 5 to 8 inches, and, also adding a second component which comprises said at least two cement dispersant polycarboxylate polymers, the polysaccharide biopolymer, and the modified cellulose.

Alternatively, the at least two cement dispersant polycarboxylate polymers, the polysaccharide biopolymer, and the modified cellulose can be added into the concrete load mixture at the construction delivery site, while conventional plasticizers (with or without other admixtures) can be initially batched and/or added into the load during transit from batch plant to delivery site.

In addition to high range water reducing admixtures, the concrete load mixture can also be modified during batching, transit, or discharge with one or more additional chemical admixture selected from the group consisting of air entraining agent, air detraining agent, set retarding agent, set accelerating agent, or mixtures thereof.

The present invention thus provides concrete and concrete structures, as formed by the above-described process, as well as admixture compositions.

An exemplary admixture composition comprises: (A) a polysaccharide biopolymer selected from the group consisting of welan, diutan, xanthan, guar gum, or mixture thereof, the biopolymer being present in the amount of 0.02 to 2 weight percent (wt %) based on total weight of the admixture composition; (B) a modified cellulose present in the amount 0.4 to 4 wt % based on total weight of the admixture composition; and (C) at least two cement dispersant polycarboxylate comb polymers having pendant (poly)alkylene oxide groups selected from ethylene oxide, propylene oxide, or mixture thereof, said at least two comb polymers each being present in the amount of 2 to 20 wt % based on total weight of the admixture composition, a first of said at least two comb polymers having zero to less than six percent mole fraction hydrolysable groups selected from esters, amides, or mixture thereof, and a second of said at least two comb polymers having six percent or higher mole fraction of hydrolysable groups selected from esters, amides, or mixture thereof, and said second comb polymer having at least two percent more hydrolysable groups than said first comb polymer.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples.

Example 1

In the following examples, exemplary concrete compositions and admixture compositions of the present invention, comprising at least two dispersant polycarboxylate comb polymers which are different from each other, can be obtained or manufactured in accordance with U.S. Pat. No. 8,080,875.

Slump enhancing ("SE") and slump retaining ("SR") polymers as defined in U.S. Pat. No. 8,070,875, owned by the common assignee hereof, are believed to be suitable polymers for the cement dispersant function contemplated, and a gluconate such as sodium gluconate can be used for moderating the effect of the SE polymer if desired.

In the '875 patent, the exemplary material SE-1 is Aqualoc® HS-1 dispersant from Nippon Shokubai, and the exemplary material SR-1 is Mighty® 21RS dispersant from Kao Polymers. Many other polymers are sold as superplasticizers, and formulated into High Range Water Reducers (HRWR) and other admixtures. Aqueous solutions of the key components including SR polymers are added to the inventive examples as well as used for purpose of comparative examples. Those skilled in the art will recognize these as components of a formulation to which biocides, defoamers, retarders such as gluconates, could be added in a final formulation.

Furthermore, although the examples below make use of two liquid admixtures to create the inventive hydratable cementitious composition, each of the components may be added individually, as solids or dissolved in water.

Along with solutions described above, commercial admixtures are also used in the following examples. These include ADVA® 198 high range water reducer (HRWR) available from GCP Applied Technologies Inc., Cambridge, Mass., which includes a slump enhancing polymer and Darex® II air entraining agent (AEA) also available from GCP. Where necessary, the slump value is measured according to ASTM C143/C143M-15a and the slump flow and VSI (visual segregation index) are measured according to ASTM C1611/C1611M-14.

Example 1 consists of a comparison between three different concrete mixes. Mix 1 represents a typical HRWR mix with moderate fluidity. Mix 2 is an attempt to increase the fluidity through conventional means: increasing the dosage of the HRWR. Mix 3 demonstrates the use of an exemplary formulation of the present invention. All three mixes contain the same base concrete mix design including: 1200 pounds per cubic yard (lbs/yd$^3$) of stone with a nominal maximum size of 0.75 inches, 490 lbs/yd$^3$ of stone with a nominal maximum size of 0.375 inches, 1350 lbs/yd$^3$ of sand, 611 lbs/yd$^3$ of an ASTM Type I/II cement and 280 lbs/yd$^3$ of water. Mix 1 contained 5 oz/100 cwt (i.e., 5 ounces per hundred pounds of cementitious materials, or "cwt") of ADVA® 198 HRWR (including a slump enhancing polymer), Mix 2 contained 8 oz/cwt of ADVA® 198 HRWR, and Mix 3 contained 5 oz/cwt of ADVA® 198 HRWR as well as 0.037 lbs/cwt of Polycarboxylate ether 1 (PCE-1), 0.037 lbs/cwt of PCE-2, 0.0021 lbs/cwt of hydroxypropyl methyl cellulose, 0.0011 lbs/cwt of diutan gum. All mixes were mixed according to the following protocol: at high speed, mix the stone, sand and 80% of the water for 2 minutes; add the cement and continue mixing at high speed for 2 minutes; add the HRWR (and inventive solution if present) and continue mixing at high speed for 2 minutes; turn the mixer off and rest for 3 minutes; and resume mixing at high speed for 3 minutes.

At this point, a portion of the concrete was sampled and the slump, slump flow and VSI were measured for each of the three mixes. After this point, the concrete was returned and the concrete was mixed at low speed for 15 minutes. The concrete was then sampled and tested again, after which, the concrete was returned to the mixer and mixed again at low speed for another 30 minutes. After mixing, a sample was taken for a final set of measurements. The results are presented in Table 1:

TABLE 1

| Mix ID | Sample after 9 minutes | | | Sample after 30 minutes | | | Sample after 60 minutes | | |
| --- | --- | --- | --- | --- | --- | --- | --- | --- | --- |
| | Slump [in] | Slump flow [in] | VSI | Slump [in] | Slump flow [in] | VSI | Slump [in] | Slump flow [in] | VSI |
| Mix 1 | 8.25 | | | 7.50 | | | | | |
| Mix 2 | 10.5 | 25.0 | 1.5 | 9.25 | 19.0 | 1.0 | 8.25 | 16.25 | 0.0 |
| Mix 3 | 10.75 | 25.5 | 1.0 | 10.0 | 21.0 | 0.0 | 10.25 | 20.0 | 0.0 |

At 9 minutes, Mix 1 exhibits a typical slump for a HRWR mix design. With the additional ADVA® 198 HRWR, Mix 2 was able to achieve higher flow (25 inches), but showing borderline segregation characteristics with a VSI of 1.5. Mix 3, however, was able to achieve about the same flow (25.5 inches) with a better segregation resistance (lower VSI). Over time, it can be seen that Mix 3 has a superior slump life over Mix 2. Moreover, the VSI quickly reaches a value of 0 whereas Mix 2 still shows signs of segregation at 30 minutes. At each of the time intervals, it is possible to determine the ratio between the radial spread, R, (slump flow divided by two) and the height of the concrete mass, H, (the slump value subtracted from twelve inches). These calculations are shown in Table 2:

TABLE 2

| Mix ID | 9 minutes | 30 minutes | 60 minutes |
| --- | --- | --- | --- |
| Mix 2 | 8.3 | 3.5 | 2.2 |
| Mix 3 | 10.2 | 5.3 | 5.7 |

The underlined values fall within an acceptable R/H as illustrated in FIGS. a, 6b, and 7. As such, Mix 3 shows not only excellent slump life, but also a surprisingly controllable leading edge for at least 60 minutes.

Example 2

In this example, the benefit of using two PCE polymers, PCE-1 and PCE-2 with slightly different performance is demonstrated. Three different concrete mixes were compared, all containing an SE polymer in the base HRWR: Mix 4, a concrete mix containing a high range water reducer superplasticizing cement dispersant polymer (hereinafter HRWR) with PCE-2 polymer and viscosity-modifying package; Mix 5, a concrete mix containing a HRWR with an PCE-1 polymer and viscosity-modifying package; and Mix 6, a concrete mix containing a HRWR with an SE polymer in the HRWR and both PCE-1 and PCE-2 polymers along with the viscosity-modifying package, which is an example of the present invention.

All mixes were mixed and tested according to the same protocol used in Example 1, except that samples were taken at 45 minutes and 75 minutes in addition to the 9, 30 and 60 minute samples. The base concrete design for all three mixes consisted of: 1570 lbs/yd$^3$ of stone with a nominal maximum size of 0.75 inches, 280 lbs/yd$^3$ of stone with a nominal maximum size of 0.50 inches, 1195 lbs/yd$^3$ of manufactured sand, 611 lbs/yd$^3$ of an ASTM Type I/II cement, 318 lbs/yd$^3$ of water and 9.2 oz/yd$^3$ of Darex® II Air Entraining Agent. Mix 4 contained 2 oz/cwt of ADVA® 198 HRWR containing an SE polymer, 0.046 lbs/cwt of PCE-2, 0.0026 lbs/cwt of hydroxypropyl methyl cellulose and 0.0017 lbs/cwt of diutan gum. Mix 5 contained 2 oz/cwt of ADVA® 198 HRWR, 0.046 lbs/cwt of PCE-1, 0.0026 lbs/cwt of hydroxypropyl methyl cellulose and 0.0017 lbs/cwt of diutan gum. Mix 6 contained 0.046 lbs/cwt of PCE-2, 0.046 lbs/cwt of PCE-1, 0.0026 lbs/cwt of hydroxypropyl methyl cellulose and 0.00170 lbs/cwt of diutan gum.

The results are presented in Table 3.

TABLE 3

| Mix ID | Slump flow [in] @ | | | | |
|---|---|---|---|---|---|
|  | 9 min | 30 min | 45 min | 60 min | 75 min |
| Mix 4 | 15.5 | 15.0 | 13.25 | 13.5 | 7.5 |
| Mix 5 | 21.0 | 18.75 | 16.25 | 14.0 | 12.5 |
| Mix 6 | 22.0 | 23.0 | 21.5 | 18.0 | 17.5 |

The comparison between Mix 4 and Mix 6 demonstrates the effectiveness of the SE polymer while the comparison between Mix 5 and Mix 6 demonstrates the effectiveness of the SR polymer. Taken together, these comparisons illustrate the benefit of concrete that comprise both the SE and SR type polymers as shown in U.S. Pat. No. 8,070,875, in this case, without the use of a slump-controlling component such as gluconate.

Example 3

In this example, comparisons will be made to highlight an important difference between the present invention and prior art. In U.S. Pat. No. 8,070,875, formulations were tailored to increase the robustness of self-consolidating concrete (SCC) with respect to water additions. SCC is typically sensitive to water additions at the jobsite, which can lead to segregation. The formulations taught by U.S. Pat. No. 8,070,875 increase the robustness of the SCC so that water additions at the site do not increase the flowability, which helps to maintain the segregation resistance. The present invention includes formulations which are believed to allow water to increase slump flow effectively when added at the jobsite, or in transit. A number of slump monitoring devices, such as those described in U.S. Pat. No. 8,020,431 (of Verifi, LLC), U.S. Pat. No. 8,848,061 (of Sensocrete, Inc.) and U.S. Pat. No. 9,199,391 (of I.B.B. Rheologie, Inc.) have been taught for use on the mixer delivery truck so that concrete can be monitored and dosed during transit.

Three different concrete mixes were compared: Mix 7, which contained a low dosage of a combination of two different thickeners, Mix 8, which contained a high dosage of a combination of two different thickeners, and Mix 9, which is taken from Example 3 of U.S. Pat. No. 8,070,875.

All three mixes were tested with the same base concrete mix comprising: 1300 lbs/yd$^3$ of stone with a nominal maximum size of 0.75 inches, 460 lbs/yd$^3$ of stone with a nominal maximum size of 0.375 inches, 1280 lbs/yd$^3$ of sand, 611 lbs/yd$^3$ of an ASTM Type I/II cement, 257 lbs/yd$^3$ of water and 5 oz/cwt of ADVA® 198. Mix 7 contained 0.0268 lbs/cwt of PCE-1, 0.0537 lbs/cwt of PCE-2, 0.0027 lbs/cwt of hydroxypropyl methyl cellulose and 0.0013 lbs/cwt of diutan gum. Mix 8 contained 0.0403 lbs/cwt of PCE-1, 0.0805 lbs/cwt of PCE-2, 0.0040 lbs/cwt of hydroxypropyl methyl cellulose and 0.0020 lbs/cwt of diutan gum. The same mixing protocol in Example 1 was used for all three mixes except, no sample was taken at 30 minutes. Furthermore, after 60 minutes, water was added to each, and remixed to achieve homogenization. Table 4 provides the results.

TABLE 4

|  | Water added [gal/yd$^3$] | Slump flow [in] | VSI |
|---|---|---|---|
| Mix 7 | 0 | 15.25 | 0 |
|  | 2 | 17.0 | 0 |
| Mix 8 | 0 | 12.0 | 0 |
|  | 2 | 16.5 | 0 |
| Mix 9 | 0 | 26.0 | 0 |
|  | 1 | 27.0 | 1 |
|  | 4 | 26.0 | 2 |

While U.S. Pat. No. 8,070,875 taught that use of two polycarboxylate polymers were needed to maintain slump over time, the results above are surprising in that the present inventors' were able to produce a concrete where slump was adjustable by the addition of non-excessive amounts of water. This is useful in placing strong concrete, where it is desirable a small amount of water will increase slump at the point of placement, preventing the use of large amounts of water, which would weaken the resulting concrete. This highlights the inventive nature of the present formulation containing two specific viscosity modifying agents (VMAs), as compared to prior art teachings in U.S. Pat. No. 8,070,875, which discloses use of only one VMA. It is the use of the specific VMAs that enable the concrete to be "re-tempered" predictably, without excessive amounts of water.

Example 4

This example illustrates the utility of a two-part system comprising a HRWR and an aqueous solution of SR polymers and viscosity modifying agents. Such a dual-part system allows more flexibility for the concrete producer, in terms of allowing for adjustment of both flowability and segregation resistance. Although typically related, these two functions can be influenced in different ways by the sand, stone, and cement. Hence, the ability to adjust each separately allows for easier control over the final concrete product. The HRWR can be selected or adjusted, based on, for example, the mix design (which can contain different amounts of cement). A separate solution containing of PCE polymers and viscosity modifying agents allows control over the final flowability and segregation resistance. In this example, three concrete mixes are compared, each with the same amount of base HRWR, but varying amounts of a solution containing components of the present invention.

Within the solution, the ratios between the individual components are kept constant (as they would be in a fixed formulation).

All three mixes were tested with the same base concrete mix comprising: 1300 lbs/yd³ of stone with a nominal maximum size of 0.75 inches, 460 lbs/yd³ of stone with a nominal maximum size of 0.375 inches, 1280 lbs/yd³ of sand, 611 lbs/yd³ of an ASTM Type I/II cement, 257 lbs/yd³ of water and 2 oz/cwt of ADVA® 198 HRWR. Mix 10 contained 0.0376 lbs/cwt of PCE-1, 0.0376 lbs/cwt of PCE-2, 0.013 lbs/yd³ of hydroxypropyl methyl cellulose and 0.0011 lbs/cwt of diutan gum. Mix 11 contained 0.0470 lbs/cwt of PCE-1, 0.0470 lbs/cwt of PCE-2, 0.00270 lbs/cwt of hydroxypropyl methyl cellulose and 0.0013 lbs/cwt of diutan gum. Mix 12 contained 0.0564 lbs/cwt of PCE-1, 0.0564 lbs/cwt of PCE-2, 0.0032 lbs/cwt of hydroxypropyl methyl cellulose and 0.0016 lbs/cwt of diutan gum. The same mixing protocol in Example 2 was used for all three mixes, including sampling and testing at 9, 30, 45, 60 and 75 minutes.

The results are shown in Table 5.

TABLE 5

|  | Mix 10 | | Mix 11 | | Mix 12 | |
| --- | --- | --- | --- | --- | --- | --- |
|  | Slump flow [in] | VSI | Slump flow [in] | VSI | Slump flow [in] | VSI |
| 9 min | 19.0 | 1.0 | 21.0 | 1.0 | 21.25 | 1.0 |
| 30 min | 18.0 | 1.0 | 19.5 | 1.0 | 20.75 | 1.0 |
| 45 min | 16.0 | 0.5 | 18.0 | 1.0 | 19.25 | 1.0 |
| 60 min | 14.5 | 0 | 16.25 | 0.5 | 19.0 | 1.0 |
| 75 min |  |  | 15.0 | 0 | 17.25 | 0.5 |

The results of Table 5 demonstrate the ability to change the slump flow while maintaining minimum segregation.

Example 5

Figure 6A:
FIG. 6a is a photograph of the profile of a concrete mass resulting from a slump flow test wherein concrete is prepared according to the present invention and poured.
Figure 6B:
FIG. 6b is a cross-sectional binary illustration of a concrete mass resulting from a slump flow test with the edge highlighted.

This example describes two possible methods to determine the leading edge characteristics of a concrete spread containing aqueous solutions of components of the present invention. Two concrete mixes are compared in this example. Both mixes were tested with the same base concrete mix comprising: 1300 lbs/yd³ of stone with a nominal maximum size of 0.75 inches, 460 lbs/yd³ of stone with a nominal maximum size of 0.375 inches, 1280 lbs/yd³ of sand, 611 lbs/yd³ of an ASTM Type I/II cement, 257 lbs/yd³ of water and 2 oz/cwt of ADVA® 198 HRWR. Mix 13 contained 0.0470 lbs/cwt of PCE-1 0.0470 lbs/cwt of PCE-2, 0.00270 lbs/cwt of hydroxypropyl methyl cellulose and 0.0013 lbs/cwt of diutan gum. Mix 14 contained an additional 20 lbs/yd³ of water to simulate typical behavior at a job site to increase slump of a HRWR mix. Using the same mix protocol as in Example 1, only one sample was taken at 9 minutes. With the concrete sample made using Mix 13, a slump flow test was performed and an image of the profile was acquired (FIG. 6a). The subsequent image was converted to a binary image (black representing the concrete and white representing the background) and the outline of the profile was determined, as shown in FIG. 6b. In FIG. 7, the outline of half of the slump flow is plotted along with a best fit using a function of the form: $h(r)=[\alpha(R-r)]^b$, which relates the height, h, of the concrete as a function of r, the radial distance, with a maximum radial spread of R and form-fitting constants a and b. Also plotted in FIG. 7 is the first derivative of h(r). In FIG. 7, note that the radial distance and height have been normalized by the maximum radial spread. Using the relationships in FIG. 7, two different characteristics can be used to quantify the leading edge. The first uses the ratio R/H, where R is the maximum radial spread and H is the height at a radial spread, r=0. For Mix 13, this ratio is 8.2, which falls within the range outlined in FIG. 5, indicating superior edge stability. For Mix 14, the ratio is 4.3, which falls outside the range outlined in FIG. 5. The slump flow for Mix 13 was 22 inches while the slump flow for Mix 14 was 22.5 inches, which further reinforces the importance of the leading edge, not just the actual slump flow value.

The second characteristic that can be used to quantify the leading edge determines the height, h, where the derivative (or slope) falls below a given value. At this point, the edge rapidly forms indicating the final edge. For concretes with superior edge stability, the height will be higher at this point. In this case, the critical slope, $S_{crit}$ is taken as tan $$\left(\frac{\pi}{4}\right) = 1.$$

For the Mix 13, the height where the rate of the slope falls below −1 is 0.19 (or 19% of the maximum height). For Mix 14, the height where the rate of the slope falls below −1 is practically 0. This indicates that Mix 13 carries a significant edge compared to Mix 14 as a result of a superior edge stability. Again, it should be pointed out that, even though similar slump flow value is achieved, surprisingly, the edge stability is distinctly different. This suggests that a different rheological parameter than yield stress and viscosity is being affected by the inventive combinations of the present invention to enable an increase in the stability of the edge.

Example 6

Rheological Measurements: Conventional and exemplary concretes were made with 1200 pounds per cubic yard (lbs/yd³) of stone with a nominal maximum size of 0.75 inches, 490 lbs/yd³ of stone with a nominal maximum size of 0.375 inches, 1350 lbs/yd³ of sand, 611 lbs/yd³ of an ASTM Type I/II cement and 280 lbs/yd³ of water. Self-consolidating concrete was made using 1450 pounds per cubic yard of stone with a nominal maximum size of 0.375 inches, 1334 lbs/yd³ of sand, 846 lbs/yd³ of an ASTM Type I/II cement and 338 lbs/yd³ of water.

All mixes were mixed according to the following protocol: at high speed, mix the stone, sand and 80% of the water for 2 minutes; add the cement and continue mixing at high speed for 2 minutes; add the HRWR (and inventive solution if present) and continue mixing at high speed for 2 minutes; turn the mixer off and rest for 3 minutes; and resume mixing at high speed for 3 minutes. At this point, a portion of the concrete was removed from the mixer, the slump, slump flow and VSI were measured and rheological data were acquired.

For the rheological measurements, the ICAR™ Plus rheometer vessel was loaded and tapped at ⅓, ⅔ and full. The vane was then inserted in the mixer, and the static yield stress measurement was carried out at 0.05 rad/s. The peak torque is read and converted to a static yield stress. Immediately following, the torque was measured for mixing at each of the shear rates, beginning with the highest shear rate. The shear rates used in this experiment were (in rad/s) 1, 0.85, 0.7, 0.55, 0.4, 0.25 0.1. This allowed the assembly of a plot of shear rate vs shear stress (See FIG. 7). The data were fit to a straight line, according to the Bingham Model, and the plastic viscosity is transformed by the ICAR™ software from the slope of the straight line fit; the Bingham yield stress is extrapolated from the y-intercept according to the Reiner-Rivlin equations. Measurements were carried out on two or three batches of each type of concrete and the results averaged.

In further exemplary embodiments, the concrete has a static yield stress of less than about 1500 Pa, a Bingham yield stress of greater than about 40 Pa, and a plastic viscosity of less than about 100 Pa s, when measured by the ICAR™ Plus rheometer, where the vessel was loaded and tapped at ⅓, ⅔ and full (wherein the vane is inserted in the mixer, static yield stress measurement is carried out at 0.05 rad/s; the peak torque is read and converted to static yield stress; and immediately thereafter the torque is measured for mixing at each of the shear rates, beginning with the highest shear rate, e.g., in rad/s, 1, 0.85, 0.7, 0.55, 0.4, 0.25 0.1; and shear rate vs shear stress is plotted (See FIG. 7); data is fitted to a straight line, according to the Bingham Model, and the plastic viscosity is transformed by the ICAR software from the slope of the straight line fit; Bingham yield stress is extrapolated from the y-intercept according to the Reiner-Rivlin equations; and measurements are carried out on two or three batches of each type of concrete and results averaged).

Figure 8:
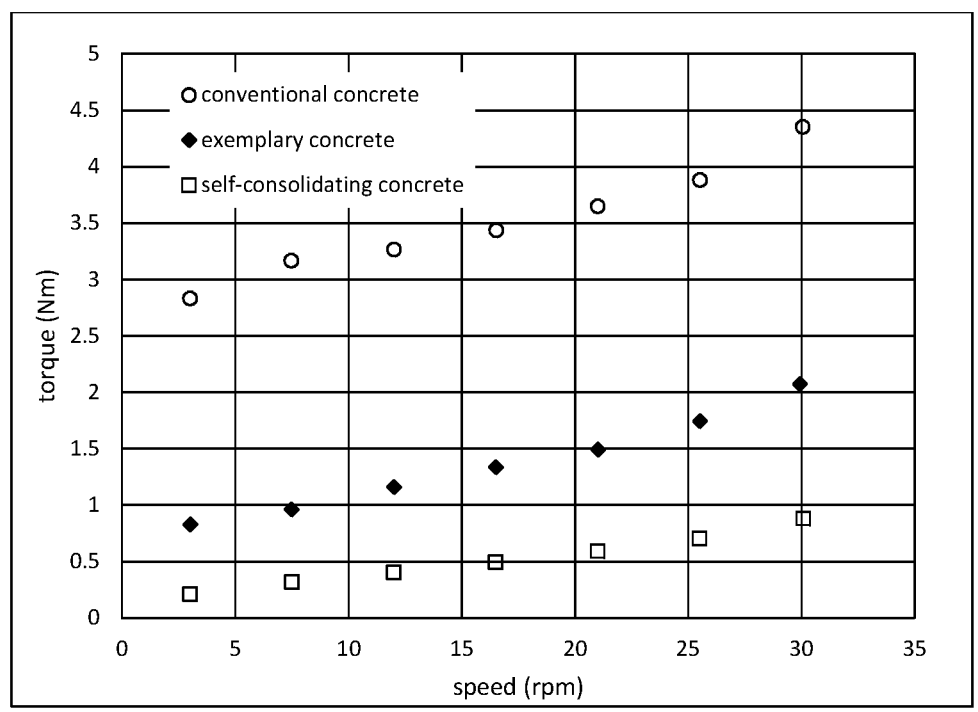
FIG. 8 Is a graph of shear rate vs. torque for three concretes, conventional concrete (slump 6-8 inches), exemplary concrete, and self-consolidating concrete.
Figure 9:
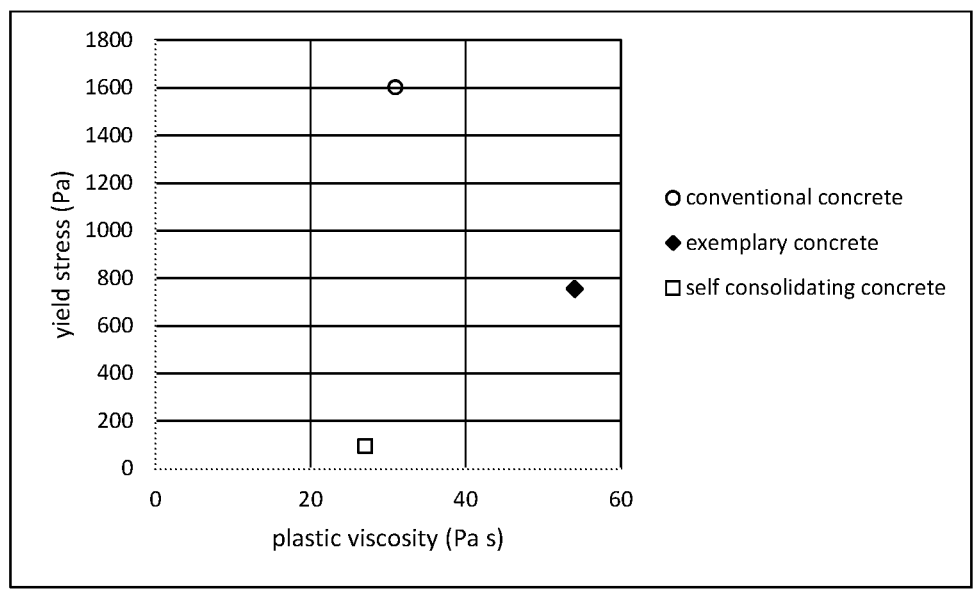
FIG. 9 Is a rheograph showing plastic viscosity plotted against dynamic yield stress for conventional concrete, exemplary concrete and self-consolidating concrete.

The data are plotted in FIG. 8 and tabulated below in Table 6.

TABLE 6

| | air (%) | slump inches | slump flow inches | VSI | static yield stress | Bingham yield stress | plastic viscosity |
|---|---|---|---|---|---|---|---|
| conventional concrete | 2.1 | 7.5 | — | — | 1603 | 649 | 31 |
| exemplary concrete | 2.0 | 9.5 | 18 | 0.75 | 756 | 107 | 54 |
| self-consolidating concrete | 0.85 | 10.5 | 25 | 1.25 | 95 | 19 | 27 |

The data clearly show the exemplary concrete flows easily; the static yield stress is much lower than that of conventional concrete. In addition, the Bingham yield stress (a measure of cessation of flow) for self-consolidating concrete is very low, often, SCC does not stop flowing until it meets an obstacle (self-leveling). The exemplary concrete has a small Bingham yield stress, indicating it flows well, but will cease flowing.

The foregoing example and embodiments were present for illustrative purposes only and not intended to limit the scope of the invention.

It is claimed:

1. A process for placing a high flow concrete into a placement zone, comprising:
   (A) providing, at a delivery site, at least one concrete delivery mixer-truck load of concrete having a total pour volume of 1 to 16 cubic yards into a placement zone, the concrete load mixture comprising (i) coarse aggregate in the amount of at least 1550 pounds per cubic yard based on total volume of the concrete load mixture, wherein at least thirty percent of the coarse aggregate is retained on a sieve with a 0.5 inch opening as determined by standard sieve testing under ASTM C33/C33M-16; (ii) cementitious binder in the amount of 376-752 pounds per cubic yard of the concrete load mixture; (iii) a polysaccharide biopolymer selected from the group consisting of welan, diutan, xanthan, guar gum, or mixture thereof, the biopolymer being present in the amount of 0.0003 to 0.003 per hundred pounds of cementitious binder within the concrete load mixture; (iv) a modified cellulose present in the amount of 0.0005 to 0.005 per hundred pounds of cementitious binder within the concrete load mixture; and (v) at least two cement dispersant polycarboxylate comb polymers having pendant (poly)alkylene oxide groups selected from ethylene oxide, propylene oxide, or mixture thereof, said at least two comb polymers each being present in the amount of 0.02 to 0.12 pounds per 100 pounds of cementitious binder in the concrete load mixture, a first of said at least two comb polymers having zero to less than six percent mole fraction hydrolysable groups selected from esters, amides, or mixture thereof, a second of said at least two comb polymers having six percent or higher mole fraction of hydrolysable groups selected from esters, amides, or mixture thereof, and said second comb polymer having at least two percent more hydrolysable groups than said first comb polymer; and
   (B) pouring, into a placement zone to form a pavement, slab, floor, elevated deck, foundation, bridge deck, wall, column, dam, or portion thereof, the concrete load mixture having a slump flow within the range of 13 to 30 inches.

2. The process of claim 1 wherein the placement zone has a volume which exceeds the delivery truck-load pour volume.

3. The process of claim 1 wherein the concrete load mixture comprises a fine aggregate selected from natural sand, manufactured (crushed) sand, or mixture thereof.

4. The process of claim 3 wherein the fine aggregate comprises at least 50% manufactured (crushed) sand based on weight of total fine aggregates in the concrete load mixture.

5. The process of claim 1 wherein the at least two cement dispersant comb polymers are both obtained from three monomer Components A, B, and C, wherein Component A is an unsaturated carboxylic acid monomer represented by structural formula 1,

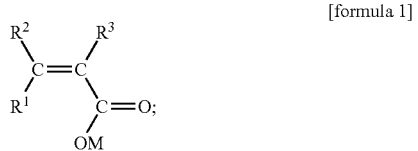

[formula 1]

component B is a polyoxyalkylene monomer represented by structural formula 2:

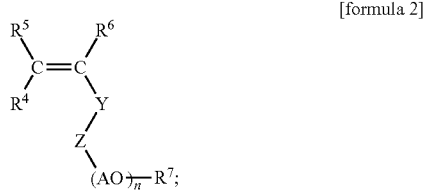

[formula 2]

and
component C is an unsaturated carboxylate ester or amide monomer represented by structural formula 3:

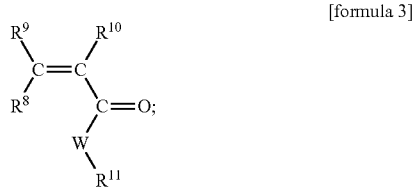

[formula 3]

wherein $R^1$, $R^2$, $R^3$, $R^4$, $R^5$, $R^6$, $R^7$, $R^8$, $R^9$, and $R^{10}$ each individually represent a hydrogen atom, a C1 to C4 alkyl group, or —COOM group wherein M represents a hydrogen atom or an alkali metal; Y represents $-(CH_2)_p-$ wherein "p" represents an integer of 0 to 6; Z represents —O—, —COO—, —OCO—, —COHN—, or —NHCO— group; -(AO)n represents repeating ethylene oxide groups, propylene oxide groups, butylene oxide groups, or a mixture thereof; "n" represents the average number of repeating -(AO)- groups and is an integer of from 10 to 250; W represents an oxygen atom or an —NH— group, and $R_{11}$ represents a $C_1$-$C_{10}$ alkyl group or a $C_2$-$C_{10}$ hydroxyalkyl group.

6. The process of claim 5 wherein the first of said at least two comb polymers provides slump enhancement in the concrete load mixture and has components A and B in a molar ratio (A:B+C) in the range of 2:1 to 5:1, and comprises component C in an amount of 0 to less than 0.2 [mole fraction of repeat units]; and wherein the second of said at least two comb polymer enhances slump retention in the concrete load mixture and has components A, B, and C in the molar ratio range (A:B+C) of 0.3:1 to 3:1, wherein component C is present in an amount of at least 0.2 [mole fraction of repeat units]; and further wherein the first polymer and second polymer are present in the ratio of 9:1 to 1:9.

7. The process of claim 6 wherein the concrete mix load comprises at least three different cement dispersant polycarboxylate comb polymers.

8. The process of claim 6 wherein one comb polymer is used having six percent or higher mole fraction of hydrolysable groups selected from esters, amides, or mixture thereof, and two comb polymers having at least two percent more fewer hydrolysable groups than said first comb polymer.

9. The process of claim 1 wherein the concrete mix load wherein the biopolymer is diutan and the modified cellulose is hydroxypropylmethylcellulose.

10. The process of claim 1 wherein the modified cellulose is selected from the group consisting of hydroxyethylmethylcellulose, hydroxypropylmethylcellulose, or mixture thereof.

11. The process of claim 1 wherein the concrete mix load further comprises at least one additional chemical admixture component selected from the group consisting of a set retarder, a set accelerator, an air detraining agent, an air entraining agent, a finishing or pumping aid, shrinkage reducing admixture, expanding agents, fibers, corrosion inhibitor, pigments, a clay mitigating agent or a mixture thereof.

12. The process of claim 1 wherein the concrete load mixture is poured having a slump flow within 16 to 24 inches.

13. The process of claim 1 wherein the placement zone is prepared for concrete flatwork as defined by ACI CT-16, whereby the pouring provides a concrete pavement, slab-on-grade, mat foundation, floor, bridge deck, or portion thereof.

14. The process of claim 13 wherein the concrete being poured into an area prepared for concrete flatwork as defined by ACI CT-16, having a slump flow radius, R, as a result of performing a slump flow test in accordance to ASTM C1611/C1611M-14, and a maximum height, H, of the concrete mass as a result of performing a slump flow test in accordance to ASTM C1611/C1611M-14, has an H value $$1 \le \frac{\pi R^2 H}{V} \le 2.5,$$

that satisfies: where V is the volume of the slump cone.

15. The process of claim 14 wherein the concrete being poured into an area having concrete flatwork as defined by ACI CT-16, the concrete having a leading edge has a curvature compared to an uppermost area of the concrete poured when subjected to slump flow test in accordance to ASTM C1611/C1611M-14, wherein the height as a function of the radial spread, h(r), evaluated where the first derivative of h(r) with respect to r is equal to −1 and normalized by the maximum height (H) of the concrete mass resulting from performing a slump flow test in accordance to ASTM C1611/C1611M-14, wherein H is greater than or equal to a critical height, $h_{crit}$, of 0.05.

16. The process of claim 1 wherein the at least two cement dispersant polycarboxylate polymers, the polysaccharide biopolymer, and modified cellulose are introduced into the concrete load mixture during batching of the concrete load mixture at a batch plant.

17. The process of claim 16 wherein the concrete load mixture contains further amounts of at least one cement dispersant polycarboxylate polymer introduced into the load mixture during transit of the concrete from the batch plant to the delivery site, at the delivery site or combinations thereof.

18. The process of claim 17 wherein said concrete load is poured from concrete delivery mixer trucks having onboard slump monitoring systems, slump flow monitoring systems or combinations thereof.

19. The process of claim 18 wherein a slump below 9 inches is maintained during transit and increased to a slump above 9 inches after the delivery site has been reached.

20. The process of claim 19 wherein said onboard slump monitoring systems comprise the use of hydraulic pressure sensors on delivery trucks for monitoring charge and discharge pressure of hydraulic drive connected to a rotatable concrete mixer drum used for delivery the concrete mix load.

21. The method of claim 1 wherein the concrete load mixture comprising the coarse aggregate in the amount of at least 1600 pounds per cubic yard based on total volume of the concrete load mixture.

22. The method of claim 1 wherein the concrete load mixture comprising cementitious binder in the amount of 376-708 pounds per cubic yard of the concrete load mixture.

23. The process of claim 1 wherein the concrete load mixture is prepared by introducing a first component, which comprises a high range water reducing admixture in an amount effective for achieving a slump of 5 to 8 inches, and, also adding a second component which comprises said at least two cement dispersant polycarboxylate polymers, the polysaccharide biopolymer, and the modified cellulose.

24. A concrete structure formed by the process of claim 1.

25. An admixture composition comprising:
   (A) a polysaccharide biopolymer selected from the group consisting of welan, diutan, xanthan, guar gum, or mixture thereof, the biopolymer being present in the amount of 0.02 to 0.2 wt % based on total weight of the admixture composition;
   (B) a modified cellulose present in the amount of 0.04 to 0.4 wt % based on total weight of the admixture composition; and
   (C) at least two cement dispersant polycarboxylate comb polymers having pendant (poly)alkylene oxide groups selected from ethylene oxide, propylene oxide, or mixture thereof, said at least two comb polymers each being present in the amount of 2 to 20 wt % based on total weight of the admixture composition, a first of said at least two comb polymers having zero to less than six percent mole fraction hydrolysable groups selected from esters, amides, or mixture thereof, a second of said at least two comb polymers having six percent or higher mole fraction of hydrolysable groups selected from esters, amides, or mixture thereof, and said second comb polymer having at least two percent more hydrolysable groups than said first comb polymer.

\* \* \* \* \*